United States Patent [19]

Lee

[11] Patent Number: 5,125,033
[45] Date of Patent: Jun. 23, 1992

[54] BODY SENSE SPEAKER

[76] Inventor: Jeong-gi Lee, #342-17, Gil-dong, Kangdong-gu, Seoul, Rep. of Korea

[21] Appl. No.: 653,501

[22] Filed: Feb. 11, 1991

[30] Foreign Application Priority Data

Feb. 17, 1990 [KR] Rep. of Korea .................... 1742

[51] Int. Cl.⁵ ........................................... H04R 25/00
[52] U.S. Cl. .................................... 381/199; 381/203;
381/202; 381/194; 381/151; 381/200
[58] Field of Search ............... 381/203, 202, 200, 194, 381/151, 201, 199

[56] References Cited

U.S. PATENT DOCUMENTS 4,829,581  5/1989  Nieuwendijk et al. ............. 381/202
5,054,079  10/1991  Frielingsdorf et al. ............. 381/151

FOREIGN PATENT DOCUMENTS 0975461  9/1975  Canada ................................. 381/200
2113504  8/1983  United Kingdom ................ 381/200

Primary Examiner—Jin F. Ng
Assistant Examiner—Huyen D. Le
Attorney, Agent, or Firm—Robert E. Bushnell

[57] ABSTRACT

There is disclosed a body speaker comprising a casing having an upper part and a lower part, the upper part having a central circular aperture closed by a cap, a thin magnetic disk with a small diameter centrally attached on the inside of the cap, a tubular member fixed around the central circular aperture of the upper part, a solenoid coil wound around the tubular member, and an oscillation body for oscillating in response to variation of the magnetic field of the solenoid coil, wherein gaps are formed between the upper and lower surfaces of the oscillation body and the inside surfaces of the upper and lower part of the casing when the oscillation body is fixed on the inside wall of the casing by means of the oscillation ring, so that the oscillation body freely oscillates upward and downward in response to variation of the magnetic field of the solenoid coil conducting current.

19 Claims, 3 Drawing Sheets

BODY SENSE SPEAKER

TECHNICAL BACKGROUND

The present invention concerns a bodily sensed speaker, more particularly a musical sound reproducing system comprising a plurality of bodily sensed speakers.

To effectively enjoy music, usually it requires us to sufficiently feel the rhythm, tone, and melody played. The conventional musical sound reproducing system has focused on the ear for the effective feeling of these characteristics.

Meanwhile, the rhythm has a close connection with bodily movements such as dance. Hence, it may be considered that the rhythm is a factor of the music which is felt not only through the ear, but also through the body.

SUMMARY OF THE INVENTION

It is an object of the present invention to provide a bodily sensed speaker (hereinafter referred to as "body speaker") of a musical sound reproducing system which enables us to feel the music not only through the ear, but also through the body.

It is another object of the present invention to provide a music cushion equipped with a plurality of the body speakers.

It is a further object of the present invention to provide a music player's waistcoat equipped with a plurality of the body speakers.

It is still another object of the present invention to provide a music player's belt equipped with a plurality of the body speakers.

According to the present invention, a body speaker comprises a casing having an upper part and a lower part, the upper part having a central circular aperture closed by a cap, a thin magnetic disk with a small diameter centrally attached on the inside of the cap, a tubular member fixed around the central circular aperture of the upper part, a solenoid coil wound around the tubular member, and an oscillation body for oscillating in response to variation of the magnetic field of the solenoid coil, the oscillation body comprising a core consisting of a disk and a cylindrical projection formed centrally and integrally with the disk, a flat ring-shaped permanent magnet fixedly received around the cylindrical projection, a flat ring-shaped support ring concentrically fixed on the permanent magnet, and a resilient membranous oscillation ring fixed around the support ring, the outer edge portions of the oscillation ring being fixed along the inside wall of the casing, the lower end portion of the tubular member with the solenoid coil being loosely inserted into the gap between the side wall of the cylindrical projection of the core and the inside surfaces of the permanent magnet and support ring, wherein gaps are formed between the upper and lower surfaces of the oscillation body and the inside surfaces of the upper and lower part of the casing when the oscillation body is fixed on the inside wall of the casing by means of the oscillation ring, so that the oscillation body freely may freely oscillates upward and downward in response to variation of the magnetic field of the solenoid coil conducting current.

The present invention will now be described more specifically with reference to the drawings attached only by way of example.

BRIEF DESCRIPTION OF THE ATTACHED DRAWINGS

DETAILED DESCRIPTION OF CERTAIN PREFERRED EMBODIMENTS

Figure 1:
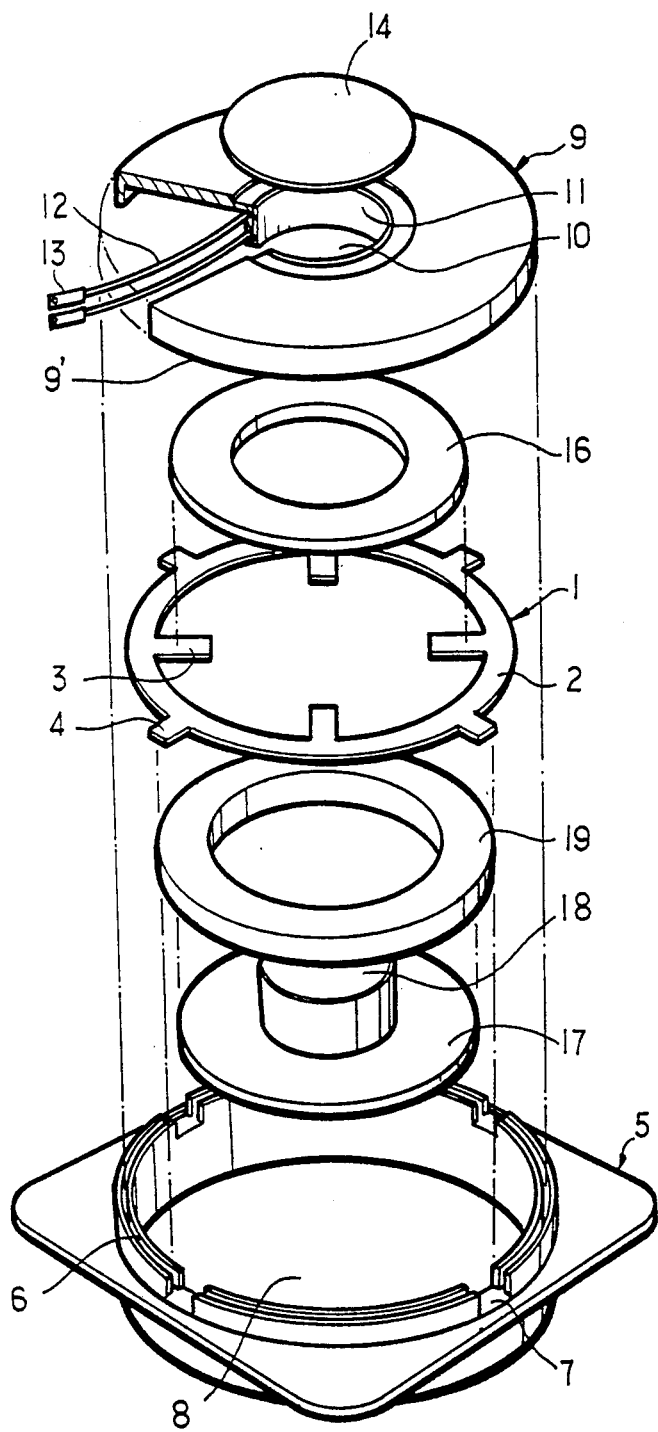
FIG. 1 is an exploded perspective view of a body speaker according one embodiment of the present invention.
Figure 2:
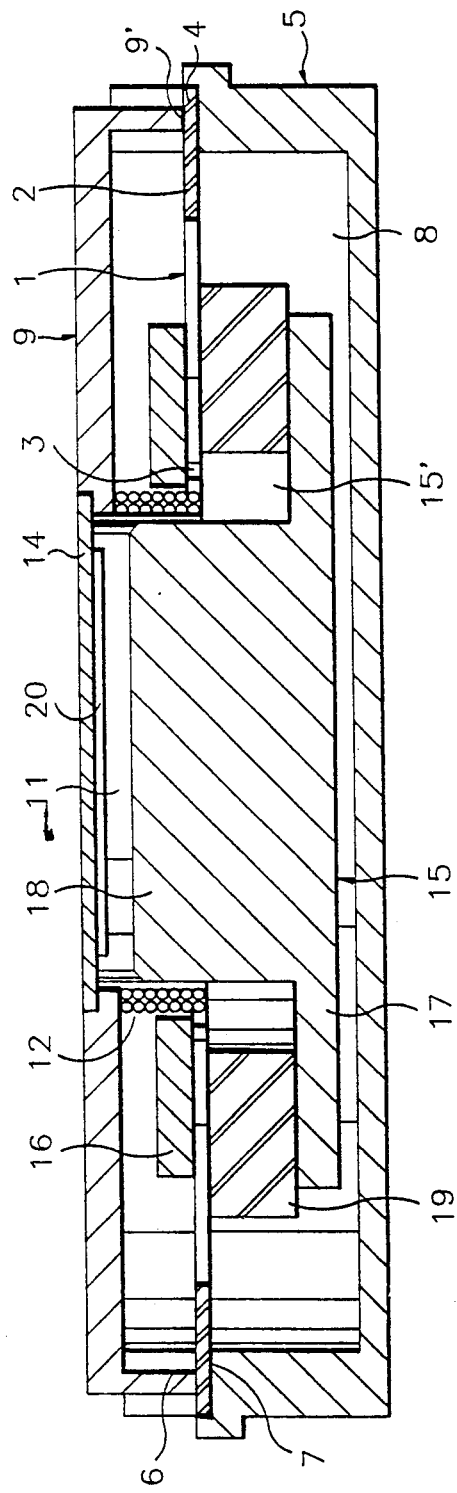
FIG. 2 is a cross sectional view of a body speaker of FIG. 1.

Referring to FIGS. 1 and 2, an oscillation body is mounted inside a casing that comprises an upper part 9 with a central circular aperture 10, a cap 14 closing the aperture 10, and a lower part 5. A thin magnetic disk 20 with a small diameter is centrally attached on the inside of the cap 14. The oscillation body comprises a core consisting of a disk 17 and a cylindrical projection 18 formed centrally and integrally with the disk 17, a flat ring-shaped permanent magnet 19, a flat ring-shaped support ring 16 and a resilient membranous oscillation ring 2.

A tubular member 11 is fixed around the central circular aperture 10 of the upper part 9, and a solenoid coil 12 is wound around the tubular member 11.

The flat ring-shaped permanent magnet 19 is fixedly received around the cylindrical projection 18 with a proper gap between the side wall of the projection and the inside surface of the permanent magnet.

As shown in FIG. 2, the resilient membranous oscillation ring 2 is fixedly arranged between the permanent magnet 19 and the support ring 16. For example, the oscillation ring 2 has a plurality of inner and outer lugs 3, 4, which inner lugs 3 are interposed between the support ring 16 and permanent magnet 19 fix the oscillation ring 2.

Thus, the support ring 16, oscillation ring 2, permanent magnet 19 and core 17, 18 are integrally fixed together so as not to allow any relative motions therebetween. Meanwhile, there is formed a suitable gap between the inside surface of the support ring 16 and the side wall of the cylindrical projection 18. The oscillation body thus obtained is suspended inside the casing by means of the outer lugs 4 interposed between the edge portions of the upper and lower part 9 and 5 as shown in FIG. 2.

Suitable synthetic resin and adhesive may be used for fixedly assembling the parts of the oscillation body. Means for fixing the oscillation ring to the inside wall of the casing may comprise a plurality of outer lugs 4 integrally formed with the oscillation ring, a plurality of grooves 7 formed on the upper end of the lower part to correspond with the lugs, and the lower end of the upper part for holding the lugs against the bottom of the grooves.

When the oscillation body is completely assembled, the tubular member 11 with the solenoid coil 12 requires to be freely moved between the inside surfaces of the support ring 16 and permanent magnet 19 and the side wall of the projection 18. Suitable gaps must be formed between the upper and lower surfaces of the oscillation body and the upper and lower inner surfaces of the casing.

Figure 3A:
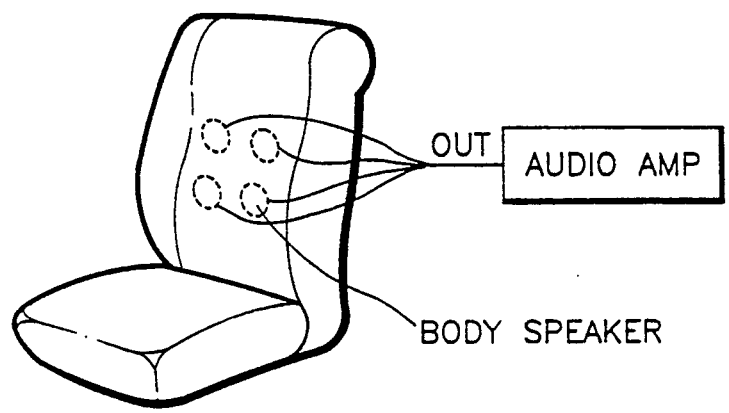
FIGS. 3a–3c illustrate various embodiments of a musical sound reproducing system according to the present invention.
Figure 3B:
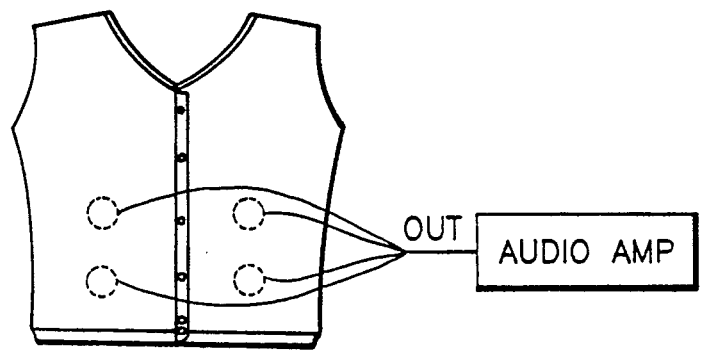
Figure 3C:
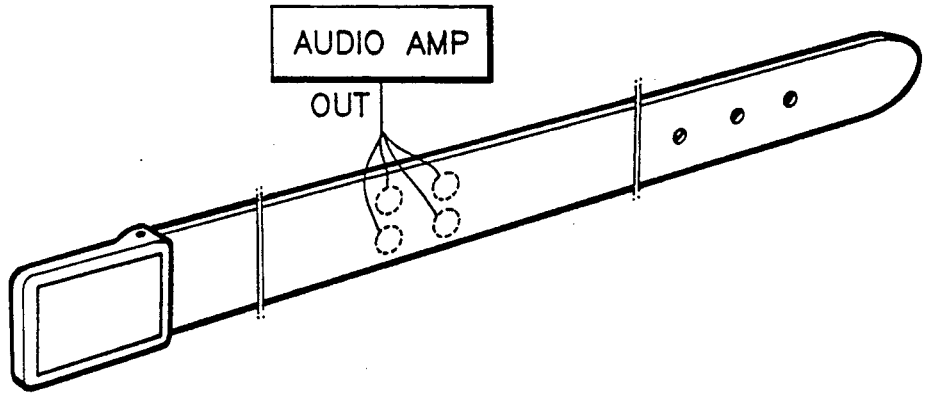

There are shown in FIGS. 3A, 3B and 3C musical sound reproducing systems, respectively comprising a cushion, waistcoat and belt equipped with the inventive body speakers, and an audio amplifier.

In operation of the body speakers, when the sound signals containing a music generated by the audio amplifier is conducted into the solenoid coil of the oscillation body 16, 17, 18, 19, 2 in the casing, the oscillation body oscillates upwards and downwards. The oscillation is caused by the interaction between variation of the magnetic field of the solenoid coil and the magnetic field of the permanent magnet 19. Consequently, the casing containing the oscillation body altogether oscillates according to variation of the intensity of the sound signals, so that the user of the cushion, waistcoat or belt containing the inventive body speakers vividly feels the rhythm of the music loaded on the sound signals through his body sensing the oscillation of the speakers.

Meanwhile, there exists always a mutual attraction between the thin magnetic disk 20 and the upper surface of the cylindrical projection 18 due to their magnetic fields, which helps the oscillation of the oscillation body 16, 17, 18, 19, 2 when the solenoid coil conducts currents.

The inventive body speakers more effectively oscillate in response to the sound signals loaded with music mostly containing medium or low tones. Hence, when listening to music reproduced by a stereo sound system comprising the inventive body speakers, only the medium and low tone signals of the music may be conducted into the body speakers so as to cause the body speakers to more effectively oscillate.

If the players of a jazz or popular music band composed of electric guitars, electronic organ, drum, etc. put on a waistcoat or belt equipped with the inventive body speakers, they may more effectively play music, fully absorbed therein, because they bodily sense the rhythm of the music that they tangibly feel through the body speakers.

Of course, it is preferable that the inventive body speakers are arranged to be in the part parts of a waistcoat or belt that are positioned in the back of the user.

Particularly, if the inventive body speakers are suitably arranged in a back cushion of a seat of a vehicle, and connected with the audio amplifier of a stereo sound system of the vehicle, there is obtained a very effective musical sound reproducing system of the vehicle.

What is claimed is:

1. A body speaker, comprising:
   a casing having an upper part and a lower part, said upper part having a central circular aperture closed by a cap;
   a thin magnetic disk with a small diameter centrally attached on the inside of the cap;
   a tubular member fixed around the central circular aperture of said upper part;
   a solenoid coil wound around said tubular member;
   an oscillation body for oscillating in response to variation of the magnetic field of said solenoid coil;
   said oscillation body comprising a core comprised of a disk and a cylindrical projection formed centrally and integrally with said disk, flat ring-shaped permanent magnet fixedly received around said cylindrical projection, a flat ring-shaped support ring concentrically fixed on said permanent magnet, and a resilient membranous oscillation ring fixed around said support ring;
   the outer edge portions of said oscillation ring being fixed along the inside wall of said casing; and the lower end portion of said tubular member with said solenoid coil being loosely inserted into the gap between the side wall of said cylindrical projection of said core and the inside surface of said permanent magnet and support ring;
   wherein gaps are formed between the upper and lower surfaces of said casing when said oscillation body is fixed on the inside wall of said casing by means of said oscillation ring, so that said oscillation body may freely oscillate upward and downward in response to variation of the magnetic field of said solenoid coil conducting current.

2. A body speaker as claimed in claim 1, wherein said oscillation ring is fixed to said support ring with means comprising a synthetic resin and adhesive applied to an inner edge of said oscillation ring.

3. A body speaker as claimed in claim 1, wherein said oscillation ring is fixed to said support ring with means comprising a plurality of inner lugs integrally formed along the inner edge of said oscillation ring, said lugs being interposed between said permanent magnet and said support ring.

4. A body speaker as claimed in claim 1, wherein said oscillation ring is fixed to the inside wall of said casing with means comprising a synthetic resin laid on the outer edge portions of said oscillation ring, said synthetic resin being interposed between the end surfaces of said upper and lower parts.

5. A body speaker as claimed in claim 1, wherein said oscillation ring is fixed to said support ring with means comprising a plurality of outer lugs integrally formed with said oscillation ring, a plurality of grooves formed on the upper end of said lower part to correspond with said lugs, and the lower end of said upper part for holding said lugs against the bottom of said grooves.

6. A musical sound reproducing system of a vehicle, comprising an audio amplifier, a plurality of the body speakers as claimed in claim 1, and a seat or back cushion equipped with said plurality of body speakers, said plurality of body speakers being arranged in a pattern within said cushion, said plurality of body speakers being connected with said audio amplifier, whereby said plurality of body speakers rhythmically oscillate in response to variation of the magnetic field of the solenoid coil conducting signals from said audio amplifier.

7. A waistcoat comprising a plurality of the body speakers as claimed in claim 1, and a pad equipped with said plurality of body speakers, said plurality of body speakers being arranged in a pattern within said pad, said plurality of body speakers being connected with said audio amplifier, whereby said plurality of body speakers rhythmically oscillate in response to variation of the magnetic field of the solenoid coil conducting signals from said audio amplifier.

8. A belt comprising a plurality of the body speakers as claimed in claim 1, and a pad equipped with said plurality of body speakers, said plurality of body speakers being arranged in a pattern within said pad, said plurality of body speakers being connected with said audio amplifier, whereby said plurality of body speakers rhythmically oscillate in response to variation of the magnetic field of the solenoid coil conducting signals from said audio amplifier.

9. A cushion equipped with a plurality of the body speakers as claimed in claim 1.

10. A body speaker, comprising:

a casing having an upper part and a lower part, said upper part having a central circular aperture closed by a cap;

a magnetic disk centrally attached to the inside of the cap;

a tubular member fixed around the central circular aperture of said upper part;

a solenoid coil wound around said tubular member;

an oscillation body for oscillating in response to variation of the magnetic field of said solenoid coil;

said oscillation body comprising a core comprised of a disk and a cylindrical projection formed centrally and integrally with said disk, a flat ring-shaped permanent magnet received around said cylindrical projection, a flat ring-shaped support ring concentrically fixed on said permanent magnet, and a resilient oscillation ring fixed around said support ring, said oscillation body being positioned by said oscillation ring, between said upper part and said lower part of said casing to oscillate between said upper part and said lower part of said casing in response to variation of the magnetic field of said solenoid coil;

the outer edge portions of said oscillation ring being fixed along the inside wall of said casing; and the lower end portion of said tubular member with said solenoid coil being loosely inserted into a gap between the side wall of said cylindrical projection of said core and the inside surfaces of said permanent magnet and support ring.

11. A body speaker as claimed in claim 10, wherein said oscillation ring is joined to said support ring with means comprising synthetic resin and adhesive applied to the inner edge said oscillation ring.

12. A body speaker as claimed in claim 10, wherein said oscillation ring is joined to said support ring with means comprising plurality of inner lugs integrally formed along the inner edge of said oscillation ring, said lugs being interposed between said permanent magnet and said support ring.

13. A body speaker as claimed in claim 10, wherein said oscillation ring to the inside wall of said casing is joined with a synthetic resin laid on the outer edge of said oscillation ring, said synthetic resin being interposed between the end surfaces of said upper and lower parts.

14. A body speaker as claimed in claim 10, wherein said oscillation ring is positioned within the inside wall of said casing with means comprising a plurality of outer lugs integrally formed with said oscillation ring, a plurality of grooves formed on the upper end of said lower part to correspond with said lugs, and the lower end of said upper part for holding said lugs against the bottom of said grooves.

15. A musical sound reproducing system of a vehicle, comprising an audio amplifier, a plurality of the body speakers as claimed in claim 10, and a seat cushion equipped with said plurality of body speakers, said plurality of body speakers being arranged in a pattern within said cushion, said plurality of body speakers being connected with said audio amplifier, whereby said plurality of body speakers rhythmically oscillate in response to variation of the magnetic field of the solenoid coil conducting signals from said audio amplifier.

16. A musical sound reproducing system of a vehicle, comprising an audio amplifier, a plurality of the body speakers as claimed in claim 10, and a back cushion equipped with said plurality of body speakers, said plurality of body speakers being arranged in a pattern within said cushion, said plurality of body speakers being connected with said audio amplifier, whereby said plurality of body speakers rhythmically oscillate in response to variation of the magnetic field of the solenoid coil conducting signals from said audio amplifier.

17. A waistcoat comprising a plurality of the body speakers as claimed in claim 10, and a pad equipped with said plurality of body speakers, said plurality of body speakers being arranged in a pattern within said pad, said plurality of body speakers being connected with said audio amplifier, whereby said plurality of body speakers rhythmically oscillate in response to variation of the magnetic field of the solenoid coil conducting signals from said audio amplifier.

18. A belt comprising a plurality of the body speakers as claimed in claim 10, and a pad equipped with said plurality of body speakers, said plurality of body speakers being arranged in a pattern within said pad, said plurality of body speakers being connected with said audio amplifier, whereby said plurality of body speakers rhythmically oscillate in response to variation of the magnet field of the solenoid coil conducting signals from said audio amplifier.

19. A cushion equipped with a plurality of the body speakers as claimed in claim 10.

* * * * *

UNITED STATES PATENT AND TRADEMARK OFFICE
CERTIFICATE OF CORRECTION

PATENT NO.   : 5,125,033
DATED        : June 23, 1992
INVENTOR(S)  : Jeong-gi Lee It is certified that error appears in the above-indentified patent and that said Letters Patent is hereby corrected as shown below:

Item [57] Abstract, change "freely oscil-" to --may freely oscillates--

|  |  | Line 15, | delete "lates". |
|---|---|---|---|
| Claim 1, | Column 3, | Line 56, | change "col" to --coil--. |
| Claim 5, | Column 4, | Line 31, | change "to said support ring" to -- to the inside wall of said casing--. |
| Claim 10, | Column 5, | Line 4, | change "to" to --on--. |
| Claim 12, | Column 5, | Line 37, | insert --a-- after "comprising". |
| Claim 13, | Column 5, | Line 42, | insert --is fixed-- after "ring" and delete "is"; and |
|  |  | Line 43, | delete "joined". |

Signed and Sealed this

Twenty-sixth Day of October, 1993

Attest:

BRUCE LEHMAN

Attesting Officer    Commissioner of Patents and Trademarks